United States Patent Office 3,236,886
Patented Feb. 22, 1966

3,236,886
METHIONINE-METHYLSULFONIUM SALTS AND
THEIR PREPARATION
Tadashi Shirai, Tokyo, Terukatsu Sakurai, Omiya-shi, and Yoshio Kanai and Yoshio Kawamura, Tokyo, Japan, assignors to Nippon Kayaku Kabushiki Kaisha, Tokyo, Japan, a corporation of Japan
No Drawing. Filed July 11, 1962, Ser. No. 209,260
Claims priority, application Japan, July 14, 1961, 36/24,710
8 Claims. (Cl. 260—534)

This invention is concerned with a method for producing methionine-methylsulfonium salts. Some of the methionine-methylsulfonium salts obtained according to the invention are novel compounds and are comparatively stable to humidity.

As regards the synthesis of methionine-methylsulfonium salts, there have been reported (1) a method in which methionine and methyl iodide or bromide are allowed to react together in an acetic and formic acid solution to form methionine-methylsulfonium iodide or bromide (see G. Toennies and J. J. Kolb; Journal of the American Chemical Society, 67, 849 (1945)); (2) a method in which methionine and methyl iodide or dimethylsulfate are allowed to react together in an aqueous solution to form methionine-methylsulfonium iodide or methosulfate (see R. O. Atkinson and F. Poppelsdorf; Journal of the Chemical Society of London, 1951, 1378); and (3) a method in which methionine, methanol and sulfuric acid are allowed to react together to form methionine-methylsulfonium hydrogen sulfate (see T. F. Lavine et al., Journal of Biological Chemistry, 207, 107 (1954)).

However, it is not easy in general to convert these methionine-methylsulfonium salts to other type of the salts. For instance, the sulfonium methosulfate is converted to the chloride with such extremely complicated processes that the methosulfate is heated with hydrochloric acid and then double-decomposed with barium chloride, followed by filtration, concentration, neutralization with pyridine, concentration, and crystallization. The method of producing the sulfonium iodide or bromide directly from methyl iodide or bromide is suitable when a synthesis to produce it in a small scale is contemplated. But, it is not suitable when it is to be used as raw material for the production of other sulfonium salts or it is to be produced in low prices. When the utilization of the method (3) is intended for production of the sulfonium bromide, the excess of sulfuric acid is neutralized up to pH 5.5 to 6.0 by barium hydroxide, and the resulting barium sulfate is filtered off, followed by double decomposition of the sulfate with barium bromide. In this method, a large amount of barium hydroxide is needed, and filtration of barium sulfate is exceedingly difficult. Besides, the double decomposition by use of the barium salt is troublesome since the salt should be carefully examined whether excess or not, in order to obtain the high purity product completely free from inorganic impurities.

After the examination of the production of various methionine-methylsulfonium salts, the inventors have succeeded in obtaining any desired sulfonium salts from another sulfonium compound by use of an ion exchange resin.

Thus, an object of the invention is to provide a method for producing methionine-methylsulfonium salts of any desired type from another methionine-methylsulfonium compound. Another object of the invention is to provide a method for producing methionine-methylsulfonium salts in high purity with a very simple and efficient procedure. Other objects would be apparent from the following descriptions.

Accordingly, the invention provides a method for producing methionine-methylsulfonium salts, which comprises treating a methionine-methylsulfonium compound-containing solution with a strongly acidic ion exchange resin, thereby to adsorb the methionine-methylsulfonium cation to the resin, treating the resin with a basic compound-containing solution, thereby to dissolve the methionine-methylsulfonium base out, and adding to the base an acidic compound corresponding to the objective salt, to yield the methionine-methylsulfonium salt.

The methionine-methylsulfonium compounds employed in the invention as raw material can be represented by the general formula

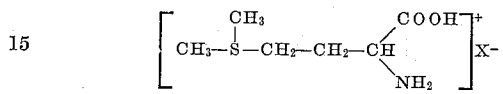

wherein X is ½SO$_4$, HSO$_4$, CH$_3$SO$_4$, Br, I, or p-CH$_3$C$_6$H$_4$·SO$_3$ These compounds can be produced by a known method or the reaction of methionine with methyl p-toluenesulfonate. Thus produced methionine-methylsulfonium compounds differ from methionine in its properties. But, its chemical behavior is not yet obvious.

The inventors have found, after broad examination of adsorption of methionine-methylsulfonium compounds by a ion exchange resin, that, by use of a strongly acidic ion exchange resin as adsorbent, the methionine-methylsulfonium cation is completely adsorbed without adsorption of the co-existing anion. Advantageously enough, this adsorption is effectively conducted even when excess of acid is present. Therefore, one of the characteristics of the present invention is that methionine-methylsulfonium cation is completely adsorbed to resin, with substantial removal of the co-existing impurities. This characteristic is displayed effectively when starting methionine-methylsulfonium compound is the one produced by reaction of methionine with methanol and sulfuric acid, that is to say, methionine-methylsulfonium compound-containing solution to be used as starting material contains a large amount of sulfuric acid and other impurities such as methyl sulfuric acid. In this case there is required no neutralization of sulfuric acid, nor removal of barium sulfate whose fine precipitates make filtration difficult. Thus, the present method is most effective in the commercial process using such material.

Any of cation exchange resins having strongly acidic radicals can be used in the present invention. The resin may be of the form substituted with a cation, such as Na$^+$, NH$_4^+$, etc., although H form is preferable in general.

Then, methionine-methylsulfonium cation adsorbed to resin is eluated with a basic compound-containing solution. Use of a basic compound for elution has never been carried out so far. The inventors have found, after examination of the elution with a basic compound, that this is very practical for the invention. Suitable basic compound-containing solutions used for the elution involve solutions of various metal hydroxides, ammonia, or various primary, secondary or tertiary amines. The solvent for the solution may be water, or other organic solvents such as methanol, ethanol, etc., or a mixture of water with an organic solvent.

If the effluent contains some basic compounds besides methionine-methylsulfonium base, a small volume of strongly or weakly acidic ion exchange resin may be used to remove the basic compounds. When the basic compounds are vaporizable, as ammonia or methylamine is, it can be conveniently removed by subjecting them to a reduced pressure or by aeration. According to the invention, methionine-methylsulfonium cation adsorbed to resin can easily be eluted with a high yield, by use of a basic compound.

To the resulting methionine-methylsulfonium base is then added an acid corresponding to the objective salt to obtain the salt in high purity with higher yield. As described in the following examples, methionine-methylsulfonium salts, inorganic salts such as chloride, nitrate, etc., and organic salts, such as naphthalenesulfonate, cyclohexylsulfamate, etc., can be obtained by addition of the corresponding acid.

These salts were found recently as pharmaceuticals. Among those obtained according to the invention, methionine-methylsulfonium cyclohexylsulfamate, benzylsulfamate, n-butylsulfamate, and others are novel compounds. They are effective medicaments for remedy of stomach ulcer and duodenal ulcer, similarly as the chloride. Further, they are much less hygroscopic and stable than the chloride, and therefore they are easily formulated in pharmaceutical preparations.

Table 1 shows water contents of methionine-methylsulfonium chloride and its sulfamates in percent against the starting material at moisture equilibrium at various relative humidities.

TABLE 1

| Relative humidity (at 26° C.), percent | $H_2O$ in system (percent) | | | |
|---|---|---|---|---|
| | Chloride | Cyclohexyl-sulfamate | Benzyl-sulfamate | n-butyl-sulfamate |
| 22.5 | 5.59 | 0 | 0 | 0 |
| 32.6 | 8.61 | 0 | 0 | 0 |
| 43 | 8.62 | 0 | 0 | 0 |
| 52 | 12.78 | 0 | 0 | 0 |
| 64 | 43.46 | 0 | 0 | 0.05 |
| 74 | 62.06 | 0 | 0 | 0.21 |
| 85 | 71.94 | 0 | 0 | 0.58 |
| 93 | 87.89 | 6.25 | 24.02 | 45.03 |
| 97 | 103.45 | 35.52 | 41.10 | 81.16 |

The present invention will further be described with reference to examples, which are, however, set forth merely by way of illustration and not by way of limitation.

*Example 1*

A mixture of 100 g. of methionine, 40 cc. of methanol and 270 cc. of 20 N sulfuric acid is refluxed for 30 minutes. The reaction mixture is diluted with 5 liters of water, and passed through 1.4 liters volume of strongly acidic ion exchange resin, Dowex-50 (H form). The resin is washed well with water until no sulfate ion is detected in washings, and then eluted with an aqueous ammonia (prepared by dilution of 200 cc. of 28% by weight ammonia with 1.3 liters of water). Upon removal of ammonia from the eluate in vacuo, an aqueous solution of methionine-methylsulfonium base is left. To the solution is added with hydrochloric acid to make the pH 5.0, and concentrated at 50° C. under a reduced pressure. The resulting syrup is mixed with a small amount of methanol to produce crystalline methionine-methylsulfonium chloride, which is separated by filtration, washed with methanol, and dried. The yield is 122 g. (91% of the theoretical amount), M.P. 135° C. (dec.).

*Example 2*

To the aqueous methionine-methylsulfonium base solution produced as in Example 1, is added cyclohexylsulfamic acid until pH reaches 5.0, and the mixture is concentrated under reduced pressure at 50° C. to produce crystalline methionine-methylsulfonium cyclohexylsulfamate. To the crystal is added methanol and the crystal is then filtered off, washed with methanol and dried to obtain 206 g. of white leaflet crystal. Yield is 90%, M.P. 150° C. (dec.). The compound is novel and it has the formula

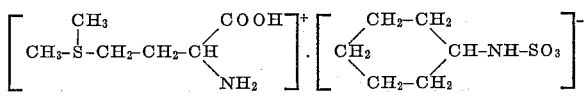

and is easily soluble in water but hardly in organic solvents.

Calc. for $C_{12}H_{26}O_5N_2S_2$—C: 42.08, H: 7.65, N: 8.18%. Found: C: 42.17, H: 7.28, N: 8.06%.

*Example 3*

4 liters of an aqueous solution containing 184 g. of methionine-methylsulfonium methosulfate obtained by reacting methionine and dimethylsulfate are passed through 1 l. of strongly acidic ion exchange resin "Amberlite IR–120" (H-form) and then thoroughly washed with water. The resin is eluted by a dilute aqueous ammonia solution. The eluate is aerated to remove ammonia, thereby to produce an aqueous methionine-methylsulfonium base solution. The solution is treated as in Example 1 by use of hydrochloric acid to obtain 120 g. of crystalline methionine-methylsulfonium chloride. Yield is 90%, M.P. 135° C. (dec.).

*Example 4*

4 liters of an aqueous solution containing 184 g. of methionine-methylsulfonium methosulfate are passed through 1 l. of "Amberlite IR–120" ($NH_4$-form) and then thoroughly washed with water. The resin is eluted by a dilute aqueous ammonia solution. The eluate is aerated to remove ammonia, thereby to produce an aqueous methionine-methylsulfonium base solution. The same procedure is followed as in Example 2 by use of cyclohexylsulfamic acid to produce 204 g. of crystalline methionine-methylsulfonium cyclohexylsulfamate. Yield is 89%. M.P. 150° C. (dec.).

*Example 5*

A mixture of 100 g. of methionine, 40 cc. of methanol and 270 cc. of 20 N sulfuric acid is heated for 30 minutes under reflux. The reaction product is diluted with 5 l. of water and then passed through 1.25 l. of "Dowex-50" (Na-form) and thoroughly washed with water until sulfate ion disappears. The resin is eluted with a solution obtained by dissolving 98 g. of sodium hydroxide in 5.6 l. of water. The eluate is further passed through 50 cc. of weakly acidic ion-exchange resin "Amberlite IRC-50" (H-form) to adsorb and remove sodium ion, thereby an aqueous methionine-methylsulfonium base solution is obtained. The solution is treated as in Example 1 by use of hydrochloric acid to produce 122 g. of crystalline methionine-methylsulfonium chloride. Yield is 91%. M.P. 135° C. (dec.).

*Example 6*

To the aqueous methionine-methylsulfonium base solution prepared by Example 5 is added cyclohexylsulfamic acid until pH reaches 5.0. The same procedure as in Example 2 is followed to produce 204 g. of crystalline methionine-methylsulfonium cyclohexylsulfamate. Yield is 89%. M.P. 150° C. (dec.).

*Example 7*

Four liters of an aqueous solution containing 184 g. of methionine - methylsulfonium methosulfate are passed through 1 l. of "Amberlite IR–120" (H-form) and then thoroughly washed with water. The resin is eluted with 4 l. of water into which 70 g. of sodium hydroxide is dissolved. The eluate is further passed through 40 cc. of "Amberlite IRC-50" (H-form) to adsorb and remove sodium ion, until an aqueous methionine-methylsulfonium base solution is obtained. The solution is treated as in Example 1 by use of hydrochloric acid to produce 119 g. of crystalline methionine-methylsulfonium chloride. Yield 89%, M.P. 135° C. (dec.).

Example 8

To the aqueous methionine-methylsulfonium base solution prepared by Example 7 is added cyclohexylsulfamic acid until pH reaches 5.0. The same procedure as in Example 2 is repeated to the solution to produce 204 g. of crystalline methionine-methylsulfonium cyclohexylsulfamate. Yield: 89%, M.P. 150° C. (dec.).

Example 9

Four liters of an aqueous solution containing 163 g. of methionine-methylsulfonium bromide is passed through one liter volume of "Dowex-50" (H-form). The resin is washed with water and then eluted with 1.2 liters of an aqueous solution containing 73 g. of methylamine. Upon aeration of the eluate to evaporate methylamine, an aqueous methionine-methylsulfonium base solution is left. To the solution in added nitric acid to make the pH 5.0, and the mixture is concentrated at 50° C. under a reduced pressure to isolate crystalline methionine-methylsulfonium nitrate. After addition of methanol, the crystals are separated by filtration, washed with methanol, and then dried. The yield is 137 g. (91% of the theoretical amount), M.P. 139° C. (dec.).

Example 10

Four liters of an aqueous solution containing 194 g. of methionine-methylsulfonium iodide is passed through one liter volume of "Amberlite IR–120" (H-form). The resin is washed with water and then eluted with 1.2 liters of an aqueous solution containing 106 g. of dimethylamine. Upon evaporation of the eluate in vacuo to remove dimethylamine, an aqueous solution of methionine-methylsulfonium base is left. To the solution is added β-naphthalenesulfonic acid to make the pH 5.0, and the mixture is concentrated at 50° C. under a reduced pressure to isolate 225 g. of crystalline methionine-methylsulfonium β-naphthalenesulfonate. After addition of methanol, the crystals are filtered. The yield is 91%. M.P. 148° C. (dec.).

Example 11

Four liters of an aqueous solution containing 223 g. of methionine-methylsulfonium p-toluenesulfonate is passed through one liter volume of Dowex-50 (H-form). The resin is washed with water, and then eluted with 1.2 liters of an aqueous solution containing 140 g. of trimethylamine. Upon evaporation of the eluate in vacuo to remove trimethylamine, aqueous solution of methionine-methylsulfonium base is left. To the solution is added benzylsulfamic acid to make the pH 5.0, and the mixture is concentrated at 50° C. under a reduced pressure to isolate crystalline methionine-methylsulfonium benzylsulfamate. After addition of methanol, the crystals in the form of white leaflets are filtered. The yield is 208 g. (89% of theoretical amount), M.P. 137.5° C. (dec.).

The compound is a novel one having the formula of

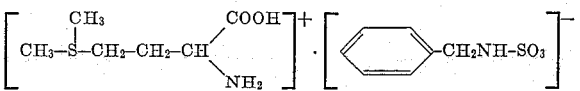

which is easily soluble in water and hardly in organic solvents.

Calc. for $C_{13}H_{22}O_5N_2S_2$—C: 44.55, H: 6.33, N: 7.99.
Found—C: 44.38, H: 6.40, N: 7.92.

Example 12

Instead of hydrochloric acid employed in Example 1, acids as listed below are added to the aqueous solution of methionine-methylsulfonium base in Example 1 to make its pH 5.0, and the mixture is concentrated at 50° C. under a reduced pressure. After addition of methanol or ethanol, the isolated crystalline methionine-methylsulfonium salt is separated by filtration. The yields are about 85% to 95%, depending upon the properties of the salts. The acids used, the salts obtained, their melting points, their yields, formulae, and analyses are set forth below.

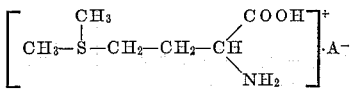

| Acids | Salts obtained | A | M.P., °C. (dec.) | Yield, percent | Formula | Anal. | C | H | N |
|---|---|---|---|---|---|---|---|---|---|
| Hydrobromic acid | Bromide | Br | 145.5 | 90 | $C_5H_{14}O_2NSBr$ | (Known compound) | | | |
| Hydroiodic acid | Iodide | I | 155 | 91 | $C_5H_{14}O_2NSI$ | (Known compound) | | | |
| Sulfamic acid | Sulfamate | $NH_2SO_3$ | 133.5 | 88 | $C_6H_{16}O_5N_2S_2$ | (Known compound) | | | |
| Methanesulfonic acid | Methanesulfonate | $CH_3SO_3$ | 136 | 92 | $C_7H_{17}O_5NS_2$ | Calcd / Found | 32.42 / 32.31 | 6.61 / 6.74 | 5.40 / 5.26 |
| Benzenesulfonic acid | Benzenesulfonate | ⌬$SO_3$ | 127 | 88 | $C_{12}H_{19}O_5NS_2$ | Calcd / Found | 44.84 / 44.86 | 5.96 / 5.83 | 4.36 / 4.52 |
| p-Toluenesulfonic acid | p-Toluenesulfonate | $CH_3$—⌬—$SO_3$ | 135 | 89 | $C_{12}H_{21}O_5NS_2$ | (Known compound) | | | |
| n-Butylsulfamic acid | n-Butylsulfamate | $n-C_4H_9NHSO_3$ | 138 | 90 | $C_{10}H_{24}O_5N_2S_2$ | Calcd / Found | 37.96 / 37.64 | 7.64 / 7.59 | 8.85 / 8.70 |
| n-Hexylsulfamic acid | n-Hexylsulfamate | $n-C_6H_{13}NHSO_3$ | 149–150 | 91 | $C_{12}H_{28}O_5N_2S_2$ | Calcd / Found | 41.84 / 41.98 | 8.19 / 8.05 | 8.13 / 7.97 |
| Dibenzylsulfamic acid | Dibenzylsulfamate | $(⌬-CH_2)_2NSO_3$ | 129 | 92 | $C_{20}H_{28}O_5N_2S_2$ | Calcd / Found | 54.40 / 54.31 | 6.62 / 6.88 | 6.34 / 6.42 |

What we claim is:

1. Methionine-methylsulfonium cyclohexylsulfamate.
2. Methionine-methylsulfonium n-butylsulfamate.
3. Methionine-methylsulfonium benzylsulfamate.
4. A method for producing methionine-methylsulfonium salts, which comprises treating a solution containing a methionine-methylsulfonium compound selected from the group consisting of its sulfate, hydrogen sulfate methosulfate, bromide, iodide, and p-toluenesulfonate, with a strongly acidic ion exchange resin, thereby to adsorb the methionine-methylsulfonium cation to the resin, treating the resin with a solution containing a basic compound selected from the group consisting of metal hydroxides, ammonia, and primary, secondary and tertiary amines, thereby to dissolvet he methionine-methylsulfonium base out, and adding to the base an acid selected from the group consisting of hydrohalic acids, nitric acid, sulfamic acid, organic sulfonic acids, and organic sulfamic acids.

5. A method according to claim 4, in which said methionine-methylsulfonium compound is its hydrogen sulfate, said basic compound is sodium hydroxide, and said acid is hydrochloric acid.

6. A method according to claim 4, in which said methionine-methylsulfonium compound is its methosulfate, said basic compound is sodium hydroxide, and said acid is cyclohexylsulfamic acid.

7. A method according to claim 4, in which said methionine-methylsulfonium compound is its methosulfate, said basic compound is ammonia, and said acid is hydrochloric acid.

8. A method according to claim 4, in which said methionine-methylsulfonium compound is its hydrogen sulfate, asid basic compound is ammonia, and said acid is cyclohexylsulfamic acid.

No references cited.

LORRAINE A. WEINBERGER, *Primary Examiner.*

LEON ZITVER, *Examiner.*

D. P. CLARKE, R. K. JACKSON, *Assistant Examiners.*